United States Patent [19]
Conway et al.

[11] Patent Number: 5,558,745
[45] Date of Patent: Sep. 24, 1996

[54] TREATMENT OF ABSORBENT SANITARY PAPER PRODUCTS

[75] Inventors: Marlene E. Conway, Brampton; Francois Jooste, Beamsville; Michael D. Smith, Brampton, all of Canada

[73] Assignee: Knowaste Technologies Inc., Mississauga, Canada

[21] Appl. No.: 81,369

[22] PCT Filed: Oct. 29, 1991

[86] PCT No.: PCT/CA91/00393
§ 371 Date: Jun. 29, 1993
§ 102(e) Date: Jun. 29, 1993

[87] PCT Pub. No.: WO92/07995
PCT Pub. Date: May 14, 1992

(Under 37 CFR 1.47)

[30] Foreign Application Priority Data

Oct. 29, 1990 [GB] United Kingdom ............... 9023488
Jun. 17, 1991 [GB] United Kingdom ............... 9113024

[51] Int. Cl.$^6$ .................................................. D21B 1/32
[52] U.S. Cl. .................... 162/60; 162/5; 162/4; 134/26
[58] Field of Search ..................... 241/79.3, DIG.38; 162/4, 60, 5, 55; 521/40; 209/2, 4, 7, 9, 727; 134/26, 27, 28, 29, 30

[56] References Cited

U.S. PATENT DOCUMENTS

| | | | |
|---|---|---|---|
| 1,798,459 | 3/1931 | Elmore et al. | 162/60 |
| 2,083,884 | 6/1937 | Wells | 162/4 |
| 3,189,516 | 6/1965 | Dachanger | 162/4 |
| 4,200,486 | 4/1980 | Vagac et al. | 162/8 |
| 4,219,381 | 8/1980 | Schnell | 162/4 |
| 4,485,509 | 12/1984 | Pellerin et al. | 8/158 |
| 4,500,640 | 2/1985 | Steffers | 162/55 |
| 4,538,767 | 9/1985 | Pimley | 241/79.3 |
| 4,760,717 | 8/1988 | Ponzielli | 68/181 R |
| 4,990,244 | 2/1991 | Anderson | 209/2 |
| 5,225,045 | 7/1993 | Watson | 162/55 |

FOREIGN PATENT DOCUMENTS

| | | | |
|---|---|---|---|
| 3199477 | 8/1991 | Japan | 162/4 |
| 2102461 | 2/1983 | United Kingdom . | |
| 9008789 | 8/1990 | WIPO . | |

OTHER PUBLICATIONS

Report on Disposable Diaper Recycling Programs, Final Report to Procter & Gamble Co., Apr. 29,1991, by Arthur D. Little, Acorn Park, Cambridge, Mass.

P & G invests $400,000 in diaper recycling project Nonwoven World, Vol. 5, No. 6, Aug. 1990.

Pulp recovery unit with separation of fluff, Abstract Bulletin of the Institute of Paper Chemistry, Vol. 56, No. 2, p. 211, Aug. 1985. Art provided by applicant but not cited on PTOL–1449.

James E. Alexander, Chemical Pulp Recovery Plant with Separation of the Flocculent Pulp,*Clovis, Inc.*, Apr. 4, 1992. NonWovens Markets, *Miller Freeman Publications Inc.*, Mar. 16, 1990.

*Primary Examiner*—Brenda A. Lamb

[57] ABSTRACT

A process for the treatment of absorbent sanitary paper products to separate such products into components thereof in a form suitable for recycling or re-use is disclosed; absorbent sanitary paper products include disposable diapers, incontinence products, feminine hygiene products, bedpads and other related absorbent and adsorbent products. The process comprises the step of treating said products in at least one bath of an aqueous solution to remove particulate and/or soluble matter from the products. The bath is operated under conditions that are conducive to non-destructive separation of said products into components thereof. In preferred embodiments, the treated product thus obtained is treated with at least one aqueous washing solution and with at least one aqueous solution of at least one of bleaching agent and antimicrobial agent, and separate streams of plastic and cellulosic materials are recovered. The process results in the recovery of usable products from absorbent sanitary paper products.

31 Claims, 3 Drawing Sheets

TREATMENT OF ABSORBENT SANITARY PAPER PRODUCTS

The present application relates to the treatment of absorbent sanitary paper products in a manner that provides materials that may be recycled for further use. As used herein, absorbent sanitary paper products include disposable diapers, incontinence products, feminine hygiene products, bedpads and other related absorbent and adsorbent products.

Absorbent sanitary paper products typically consist of (i) a non-woven sheet formed from a liquid permeable material, for example a liquid permeable membrane formed from polypropylene, polyethylene, or woven products formed from cotton or rayon, (ii) a liquid impermeable back sheet formed from for example polyethylene, polypropylene, starch based degradable plastic films, woven cloth or rubber, and (iii) an adsorbent or absorbent core of air laid wood pulp fluff, commonly referred to as air felt, and/or synthetic pulp including polypropylene or polyethylene filaments that may be bonded or unbonded, hemp or other adsorbent fibrous material. The core is typically wrapped or encased in a creped envelope of wet strength tissue paper or a material with similar characteristics. The wrapping on the core may or may not be breathable, biodegradable, odour degradable or degradable or dissolvable by other means. The core usually also contains a super absorbent polymer (SAP) material, which is typically a polyacrylate, polyacrylamide, crosslinked starch or other hydrophilic component, which may be synthetic, and may be in granular, fibrous or laminate form, possessing the ability to bond with water, urine or other body fluids or retain them without substantial release or discharge from the absorbent portion. Diapers and incontinence products typically utilize pressure sensitive adhesives for refastenable tape tabs or similar closure mechanisms. Feminine hygiene pads and incontinence products often use pressure sensitive adhesives for glue lines to attach the pad or liner to the user's undergarments. Diaper and incontinence products typically utilize elastic, polyurethane, puckering and welding or adhesives to create close fitting cuffs around the leg and waist openings to provide a more leakproof fit.

Absorbent sanitary paper products are normally disposed of along with garbage generated by households, institutions, hotels and the like, by incineration or in landfill disposal sites. Incineration tends to result in air or other pollution being generated. Landfill disposal results in an accumulation of such products.

Thus, the consequences of the convenience or necessity of use of absorbent sanitary paper products include problems relating to disposal of such products. In addition, use of either incineration or landfill disposal results in loss or destruction of the components of the absorbent sanitary paper products, rather than recycling some or all of those components to the same or other end-uses. The disposal problems are becoming of ever increasing concern to environmental and governmental authorities, and means are required for effective disposal and utilization of used absorbent sanitary paper products.

Continuous batch type washing machines for the washing of cloth goods are described by N.L. Pellerin et al in U.S. Pat. No. 4,485,509, issued 1984 Dec. 4, and by J. M. Katzfey in Canadian Patent 1,115,075, issued 1981 Dec. 29. U.S. Pat. No. 4,162,019 of C. G. Joa, issued 1979 Jul. 24, describes cutting of sanitary articles to expose the filler and then recovery of the filler using suction means; the plastic backing film is discarded. U.S. Pat. No. 4,500,040 of B. Steffens, which issued 1985 Feb. 19, describes shredding of sanitary articles followed by recovery of the filler using suction means. In U.S. Pat. No. 4,303,501, issued 1981 Dec. 1, Steffens describes the use of sieves to recover flock and cut absorbent materials from discarded sanitary articles. In U.S. Pat. No. 4,592,115, which issued 1986 Jun. 3, S. Holmstrom discloses apparatus and a process for separating cellulose fluff fibres from waste fibrous material using an apertured cylindrical separator. The aforementioned processes are understood to be directed to dry separation and recovery of components of reject products, and not recovery of components from products that have been used by consumers. R. R. Albers discloses a drum for a continuously operating laundry processing machine in U.S. Pat. No. 4,391,108, which issued 1983 Jul. 5.

It has now been found that absorbent sanitary paper products may be treateel in a manner that permits recovery of some or all of the components of such products in a form that facilitates recycling or other use of those components.

Accordingly, the present invention provides a process for the treatment of absorbent sanitary paper products to separate such products into components thereof that are in a form suitable for recycling or reuse, said products being comprised of plastic, cellulosic and super absorbent polymer fractions, characterized in that said process comprises the steps of:

(a) treating said products in at least one bath of an aqueous solution under conditions that are conducive to non-destructive separation of said products into components thereof and for separation of particulate and/or soluble matter; and (b) subsequently separating the products into at least two parts, one of which is substantially comprised of soluble matter and the other of which is substantially comprised of at least one of the plastic, cellulosic and super absorbent polymer fractions.

In a preferred embodiment of the process of the invention, in step (b), the products are separated into at least two parts, one of which is substantially comprised of particulate and soluble matter and the other of which is substantially comprised of the plastic fraction, the super absorbent polymer and cellulosic fractions being separated in the form of particulate matter.

The present invention further provides in the process the additional subsequent steps of: (c) treating at least one fraction from step (b) with at least one aqueous washing solution and with at least one aqueous solution of at least one of bleaching agent, brightening agent and antimicrobial agent; and (d) recovering separate streams of plastic, cellulosic and super absorbent polymer fractions so treated from said process.

In preferred embodiments of the processes of the invention, the conditions conducive to separation include temperature of operation of the bath, the composition of the bath and mechanical action.

In other embodiments, the super absorbent polymer in the form of particulate matter is cross-linked super absorbent polymer.

In further embodiments, the process is a continuous batch process.

The present invention further provides a method for the treatment of a super absorbent polymer comprising the step of admixing the super absorbent polymer with an aqueous solution of a water-soluble compound of at least one of an alkali metal, an alkaline earth metal, aluminum, copper (II), iron (III) and zinc, preferably with an aqueous solution of aluminum.

In a preferred embodiment of the method, the super absorbent polymer is treated with an aqueous solution of a mixture of a water-soluble compound of an alkali or alkaline earth metal with a water-soluble compound of at least one of aluminum, copper (II), iron (III) and zinc.

The invention also provides a hardened super absorbent polymer, said polymer having been treated with a water-soluble compound of at least one of an alkali metal, an alkaline earth metal, aluminum, copper (II), iron (III), and zinc, especially a mixture of a water-soluble compound of an alkali or alkaline earth metal with a water-soluble compound of at least one of aluminum, copper (II), iron (III) and zinc.

In preferred embodiments of the method of treatment of super absorbent polymer and the hardened super absorbent polymer, the polymer is an acrylic polymer.

In addition, the present invention provides apparatus for the treatment of absorbent sanitary paper products to separate such products into components thereof in a form suitable for recycling or re-use, characterized in that said apparatus comprises:

(a) a rotatable and tiltable cylindrical drum with a first end and a second end and capable of retaining an aqueous solution, said drum being tiltable from a horizontal position to a tilted position in which tilted position the second end is lower than the first end, said first end being adapted for insertion of said product into the interior of the drum and for retaining said product therein, said second end having an outlet for discharge of said product from the drum;

(b) means to rotate the drum in at least one of the horizontal and tilted positions; and (c) means to tilt the drum from the horizontal position to the tilted position.

In a preferred embodiment of the apparatus of the invention, the drum has inlet means for introduction of fluids into the drum.

The process of the present invention relates to the treatment of absorbent sanitary paper products in order to recover components thereof for recycling or other reuse, as a substitute for incineration or landfill disposal of such products. In a preferred embodiment, the process utilizes a rotating multi-shell drum, an example of which is described hereinafter. The process may also utilize apparatus of a type generally similar to that known as a tunnel washer or a continuous batch type washer, which are used in the washing of clothing, bed clothes and other articles in institutions, hospitals, hotels and other locations where a large volume of soiled articles must be washed. Continuous batch type washers are characterized by two different modes of operation, those using an archimedian screw to transfer clothing through the apparatus and those using a module system with mechanical means for the transfer of clothing.

The present invention will be described with particular reference to the embodiments shown in the drawings, in which.

In one embodiment of the invention, the process is operated in apparatus having a plurality of modules, with product being transferred between modules. In another embodiment, the process may be operated with a single module with product being subjected to the solutions in the single module in sequence. In the preferred embodiment, the process is operated with part of the process being conducted in a first module and part of the process being operated in a subsequent module or modules i.e. away from the first module.

Figure 1:
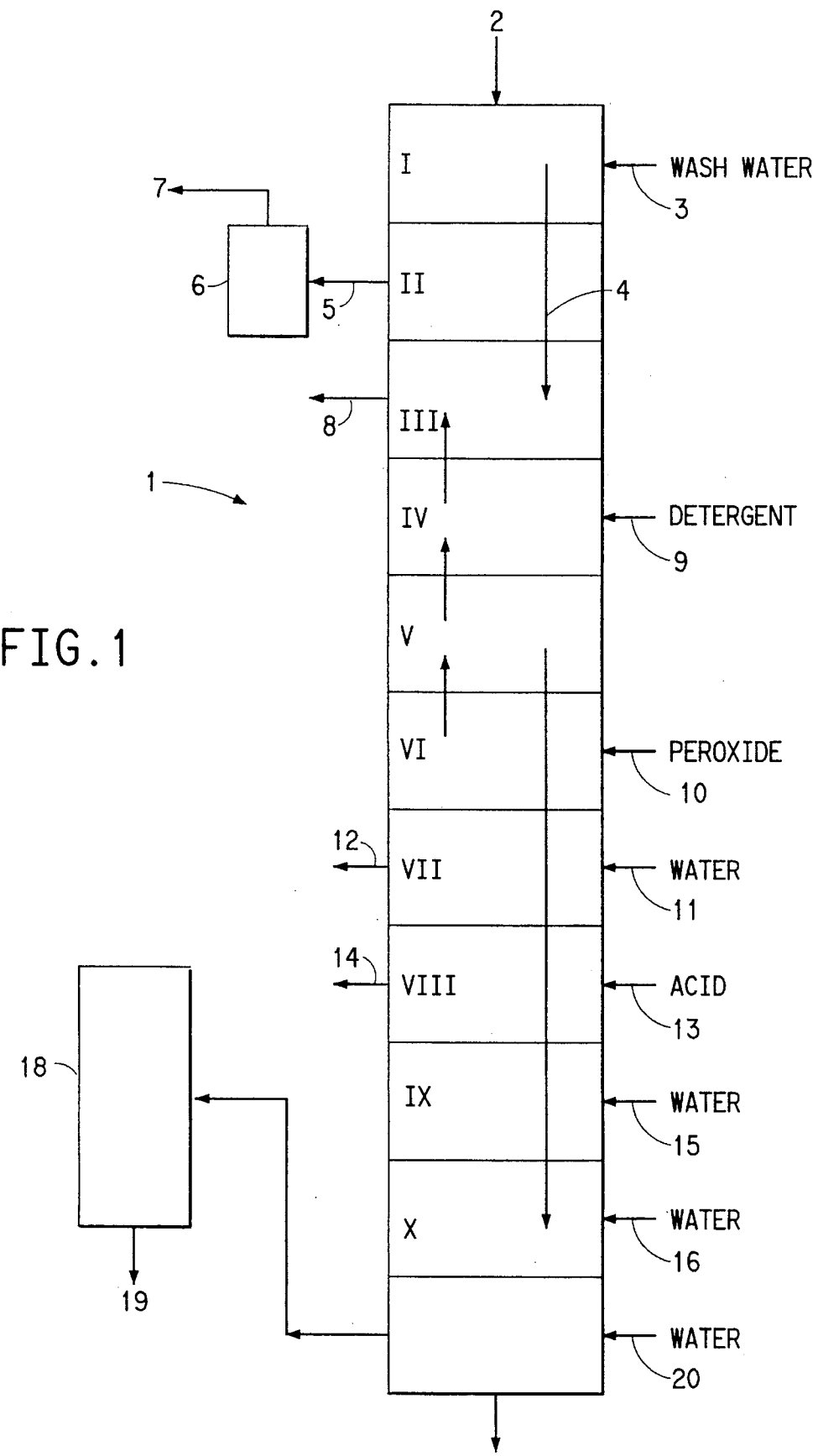
FIG. 1 is a schematic representation of a continuous batch apparatus as used in the process of the invention.

FIG. 1 relates to an embodiment in which the process is operated in a plurality of modules, and generally refers to a continuous batch apparatus 1 that is comprised of a series of modules identified by I to XI. Each module has a drum or basket mounted for movement, especially rotation, within a bath of liquid, only the module per se being shown schematically in FIG. 1. Module I is shown as being in an abutting relationship with module II, which in turn is shown as being in an abutting relationship with module III, and so on. Module I has an inlet 2 through which absorbent sanitary paper product, frequently referred to herein as stock, is fed to module I. As shown, module I also has water inlet 3 through which water may be fed to module I. The direction of movement of absorbent sanitary paper product, or parts thereof, through modules I to X is shown by arrow 4.

Module I is connected to module II so that stock may be passed from module I to module II. Module II is shown as having fluid outlet 5 which is connected to settling tank 6; other devices may be used to effect separation or removal of material fractions from the process. Settling tank 6 is shown as having a liquid outlet 7. Although module I is shown as having water inlet 3 and module II is shown as having fluid outlet 5, it should be understood that module I could also have a fluid outlet, which could also be connected to a settling tank, especially settling tank 6. Similarly, module II could have a water inlet. It is to be understood that the actual configuration of modules, fluid inlets and separation apparatus should reflect the nature of the product being fed to the process.

Figure 2:
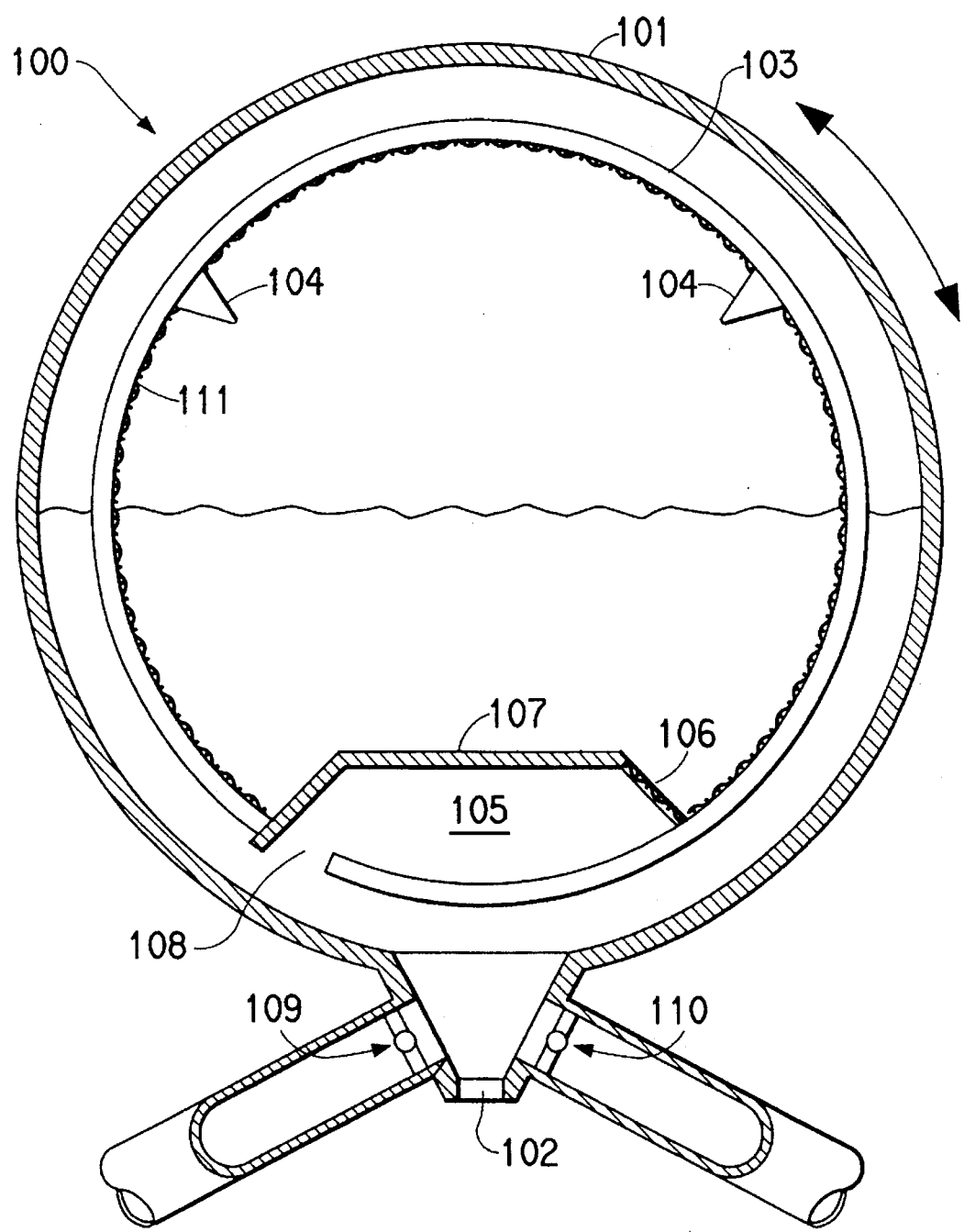
FIG. 2 is a drum for use in a preferred embodiment of the process of the invention.

The drum (or basket) in modules I and II preferably has an inner drum and an outer drum, and in a preferred embodiment is as shown in FIG. 2; the drums in subsequent modules may be of similar construction although in some instances may need to be adapted to facilitate the addition of solid material e.g. cellulosic material.

The outer drum has relatively large perforations, openings or piping connections to permit transfer of fluid therethrough. The inner drum is formed with small perforations resembling a mesh screen that will permit passage of liquid and fine particulate matter but retain the bulk of the product within the inner drum. For example, a screen having perforations of 100–200 mesh may be used, but this may be varied depending on the mode of operation of the process; the apparatus would normally have perforations substantially smaller than the perforations typically found in linen washers (about 9 mm in diameter). The perforations may have a variety of shapes. The screens should be made of a material, for example metal especially stainless steel, plastics or fibreglass, that is inert with respect to the solutions within the module during operation, including with respect to the sustenance or growth of bacteria, viruses or the like. The inner drum preferably has a water spray adapted to wash, under pressure, the perforations in a continuous or intermittent manner with fresh or recycled water, or other aqueous solution, to free the perforations of deposits of matter, and thus reduce or eliminate blinding of the screen and maintain high washing efficiency by permitting a free flow of liquid into and out of the inner drum. In modules I and II, such washing assists in removal of particulates and soluble matter, including organic matter, from the stock.

Monoshell or Archimedian screw type tunnel washers may be used in processes of the type described herein, but are less preferred. Monoshell and Archimedian screw type tunnel washers tend to have a relatively small area for the mesh which retards the ease of flow of liquid into and out of segments of such washers. In addition, there is no absolute segregation of segments of the apparatus, which is also not readily adaptable to increases or decreases in the numbers of sections of the apparatus, and not readily assembled or modified. The module system permits different speeds of rotation in different modules, isolation of treatment steps, changes of direction of rotation and of transfer of material, as well as flexibility of scale and process adjustment. It is possible to retrofit existing double drum washers to permit use according to the preferred embodiments described herein.

A preferred example of a drum of module I is shown in FIG. 2 and described hereinafter. The preferred use of that drum is also described.

FIG. 1 shows modules I and II as being of the same size as the remaining modules in the process. However, modules I and II may be of different sizes from the remaining modules, especially 2–3 times the size of the remaining modules. Such over-sizing of modules I and II may be important with respect to the swelling of stock containing SAP, as is discussed herein, the over-sized modules containing the stock while treatment of SAP is taking place and still providing loads of adequate size for subsequent modules. An alternative is to have module I or modules I and II in the form of dual modules, for example to have module I in the form of two modules with both modules I feeding into module II.

Module II is connected to module III, which is shown as having liquid outlet 8. Although module III could have an inlet for fluid, in the embodiment shown module IV has inlet 9 for fluid, identified as detergent, and module III has outlet 8 for fluid, with fluid in module IV passing to module III countercurrent to the flow of stock.

As shown in FIG. 1, module V has neither an inlet nor an outlet for fluid, but module VI has inlet 10 for a fluid identified as peroxide, preferably an aqueous solution of hydrogen peroxide, although other bleaching and/or microbiological agents may be used; it is preferred that chlorine not be used as bleaching agent for environmental reasons. The aqueous solution of peroxide passes countercurrent from module VI to outlet 8 in module III.

Module VII is shown as having water inlet 11 and fluid outlet 12. Module VIII is shown as having inlet 13, which may be used for an acid solution or for additional solution treatment chemicals, and a fluid outlet 14. Modules IX–XI are shown as having water inlets, 15, 16 and 20 respectively, with module XI having outlet 17. Outlet 17 is shown as passing to separator 18, which has outlet 19; separator 18 may actually be dewatering apparatus, driers or additional treatment tanks in addition to or instead of a separation device.

Each module preferably has sensors for measurement of temperature, nature and concentration of selected chemical species and for measuring the amount of solids and/or dissolved material in the various solutions used in the process. In addition, it is preferred that the sensors be connected to means to monitor and control important parameters in the process.

An alternate and preferred apparatus is shown, in part, in FIG. 2. The apparatus, generally shown as 100, has an outer shell 101 having a drain opening 102 located in the lowest section thereof. Inside outer shell 101 is inner basket 103. Inner basket 103 is rotatable in either direction within outer shell 101. On the inner surface of inner basket 103 are located a plurality of agitators 104 and a separation chamber 105. Separation chamber 105 is comprised of a screen 106 and a roof section 107, which may be solid or a screen. In the inner basket 103 at the end of separation chamber 105 opposite screen 106 is an orifice 108.

Drain 102 has two valves, 109 and 110, for separation of fluids or material.

Inner basket 103 may have a containment screen 111 on the inner surface thereof at locations other than separation chamber 105. Moreover, inner basket 103 may have a plurality of shark teeth or other cutter blades (not shown) on the inner surface thereof for cutting of material contained within the inner basket 103. Such blades may be formed from hardened stainless or carbide steel.

Figure 3:
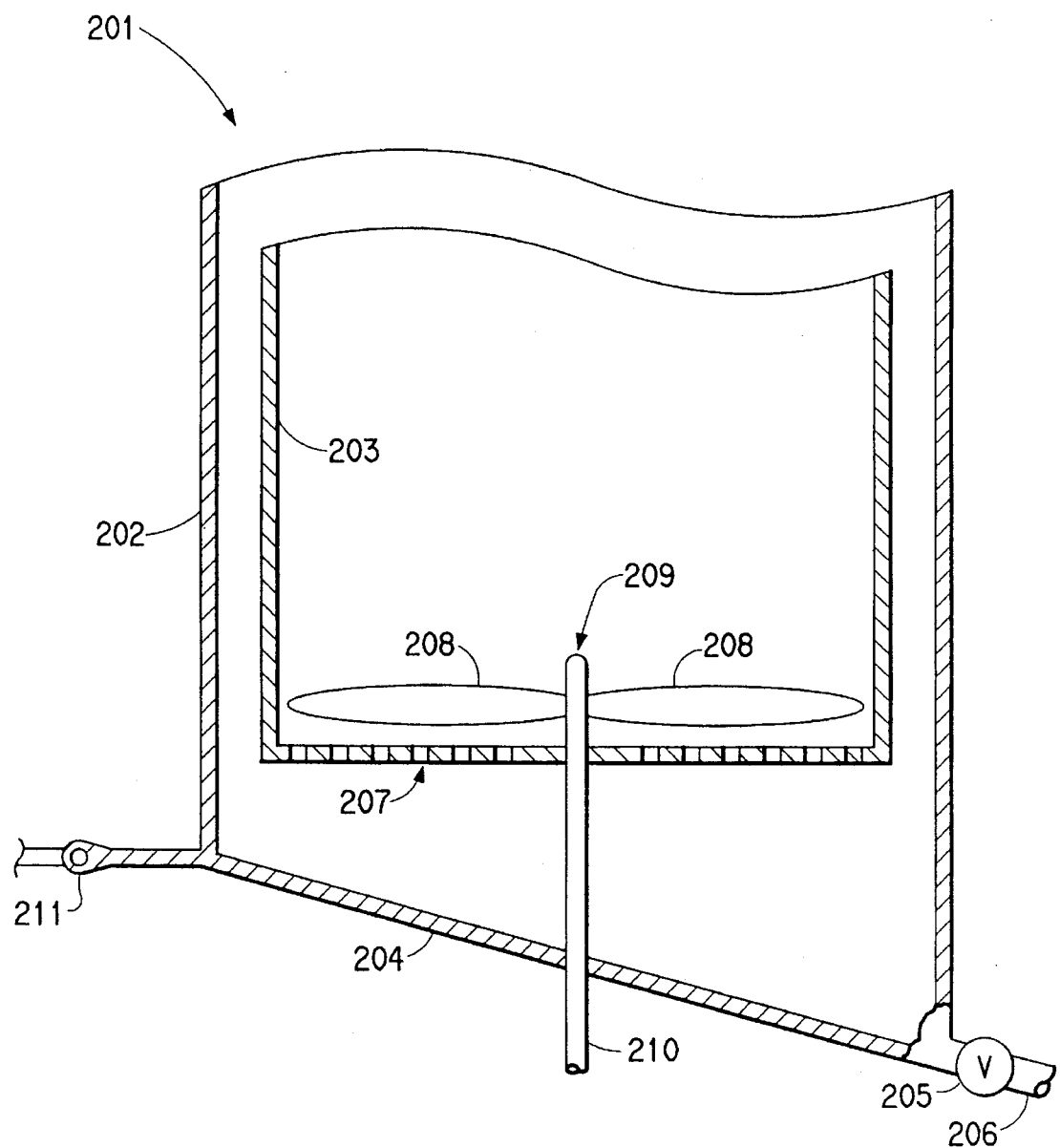
FIG. 3 is an alternate tiltable drum for use in the process of the present invention.

Another embodiment of a drum is shown in FIG. 3. Drum 201 is comprised of outer drum 202 and inner drum 203. Outer drum 202 is cylindrical in shape but with a truncated base 204 that has at its lower end a valve 205 and outlet pipe 206. Inner drum 203 has a perforated base 207, the size of the perforations being dependent on the size of solid matter that is to pass through the perforations. Inside inner drum 203 but juxtaposed to perforations 207 are blades 208 of pulper 209. Blades 208 are driven by shaft 210 which is attached to a motor (not shown).

Drum 201 is tiltable about pivot 211, so as to change the orientation of drum 201 from the vertical shown in FIG. 3 to a non-vertical orientation, especially a horizontal orientation.

In operation of the process of FIG. 1, the apparatus may have from 1 to 18, or more, modules in sequence, the embodiment shown in FIG. 1 having modules I to X. The number of modules will depend in particular on the material that is to be treated in the process and the degree or type of treatment required. A large number of modules may permit inclusion of additional processing steps, increase capacity, or permit division of one or more of the treatment stages.

Absorbent sanitary paper product or stock is fed to module I through inlet 2. In embodiments, the stock is contained in bags, containers or other wrapping material, including such material that has been conveniently included in the packaging of absorbent sanitary paper products by the manufacturer thereof for use in disposal of used product.

The amount of stock will normally be weighed prior to feeding to module I, and is preferably shredded or reduced in size using water jet cutters, serrated or rotating knives, blades, shears or other rotary cutting, shredding or granulating devices. Water jet cutters are preferred. Shredding of the stock opens up the stock, especially if it is wrapped, taped or contained in bags, containers or other wrapping material, and facilitates cleansing of the stock without the presence of folds or the like covering soiled matter e.g. feces, or trapping liquid. Such covered soiled matter or trapped liquid could contaminate solutions in subsequent modules. Shredding also reduces the sizes of plastic components, especially sheets of plastics, in the stock which would otherwise tend to cover perforations in the drums and prevent exchange of liquid into and out of the drums, and reduces the likelihood of contamination of liquid in subsequent steps in the process by carryover to subsequent modules.

Although the process is operated under conditions that are conducive to opening up of the stock, including delamination of components of the stock and melting of some adhesives used in the manufacture of the stock, it is to be understood that some adhesives and/or tabs that might be used in the manufacture of the stock, including higher melting adhesives, rubber-based adhesives and welded sections, might retain their integrity in the process. Shredding is an important preliminary step for stock having such adhesives and tabs. Nonetheless, manufacture of absorbent sanitary paper products using adhesives that are soluble under the process conditions of the invention would be advantageous.

Water is fed to module 1, through inlet 3; the water may be fresh water or it may be a stream discharged from a module downstream in the process. The liquid in module 1, and module II, is maintained under conditions that are conducive to the removal of feces and other soluble or particulate matter from the stock e.g. use of detergents, and to facilitate opening up of the stock. The latter may be further accomplished by means of the composition of the solutions used in modules I and II and the temperature of those solutions. The temperature is preferably maintained at not more than about 70° C., and especially not more than about 68° C. Water temperatures as low as ambient temperatures may be used. Higher temperatures may be used, but tend to cause de-inking of any printing on the stock and/or cause excessive delamination of products fed to the process, which may lead to processing or separation difficulties subsequently in the process e.g. due to the presence of particles or pieces of ink, spandex, hot melt adhesives, puckered sections, tape tabs or other small components.

Absorbent sanitary paper products are usually fabricated using super absorbent polymers (SAP). Such polymers facilitate wetting and wicking properties of the products, especially the cellulosic core usually present in the products, and in particular increase the liquid retention capacity of the absorbent sanitary paper products. Super-absorbent polymers tend to be acrylic polymers and starch-based polymers. At least the acrylic polymers are usually cross-linked in the manufacturing process, and cross-linking of SAP discussed herein is further cross-linking that occurs in steps in embodiments of the process of the present invention.

As a result of the inherent water absorption properties of SAP, SAP tends to swell on contact with water. Addition of stock containing SAP to the process of the invention may have major effects on the capacity of the process, the operation of the process, chemical consumption and the type and quality of the products separated. Stock containing SAP may swell to 2–5 times, or more, its dry (feed) volume on introduction to the process, causing major capacity limitations unless mechanical e.g. increased sizes of modules, temperature, pressure and/or chemical steps are taken to alleviate the problem. The chemical steps include cross-linking of the SAP in situ in modules I and II and/or addition of agents that reduce the swelling of SAP and/or change the shape and specific gravity of particles of SAP. It is believed that reduction of swelling i.e. shrinkage, of SAP should be carried out prior to or substantially simultaneously with cross-linking of the SAP. Water-soluble alkali and alkaline earth metal compounds are believed to cause shrinkage of the SAP whereas the aluminum, copper, iron and zinc compounds are believed to cause cross-linking. The treatment of the SAP should be carried out in acidic or substantially neutral solutions, especially at a pH of about 3–8, which limits the alkali and alkaline earth metal compounds that may be used. Examples of chemical compounds that may be added, usually in the form of mixtures, to the liquid in modules I and II to effect cross-linking of SAP, especially SAP formed from acrylic polymers include soluble salts of at least one of an alkali metal, an alkaline earth metal, aluminum, copper (II), iron (III), and zinc. Examples of such salts include calcium chloride, calcium nitrate, calcium sulphate, magnesium chloride, magnesium nitrate, magnesium sulphate, disodium phosphate, barium chloride, sodium carbonate and bicarbonate, trisodium phosphate, sodium silicate, potassium sulphide, aluminum sulphate, sodium bisulphate, zinc sulphate, aluminum chloride and sodium sulphate. Aluminum salts e.g. sulphate and chloride, are preferred. The preferred cross-linking agent is aluminum sulphate, especially in amounts of 0.25–5% by weight, and preferably 0.5–1% by weight. Acids e.g. acetic acid, hydrochloric acid, sulphuric acid, citric acid and nitric acid, especially acetic acid used at a pH of in the range of 3–7, may also be added.

Strong mineral acids having a pH of less than 4 tend to affect the properties of any cellulosic fibres present in the stock, adversely affecting the quality and properties of that fibre for subsequent re-use. For instance, hot hydrochloric or sulphuric acid tends to cause disintegration and brittleness in the fibre whereas those acids when cold cause softening and sponginess in the fibre.

The preferred cross-linking agents result in the SAP forming particulate, especially substantially spherical or semi-spherical hard particulate, that is readily separated with and from the soluble and particulate matter e.g. using centrifugal cleaners of the type used for removing grit from pulp, or with other suitable separation technology. Formation of the hard particulate allows the SAP to be treated like grit, as the hard particulate does not shatter or disintegrate under pressure in the manner that untreated SAP or gelled SAP do. SAP that has been cross-linked or treated to reduce swelling tends to be hard and less swollen than untreated SAP. In addition, the treated SAP has a specific gravity that is more distinct from that of water, which assists in separation of SAP in steps in the process e.g. centrifugal separation or filtering techniques become practical.

In the embodiment of FIG. 1, liquid passes from module II through outlet 5. That liquid may contain substantial amounts of particulate and/or dissolved matter, including urine, feces, blood and related matter that is on or contained in the absorbent sanitary paper products. The liquid passes to settling tank 6, from which liquid passes through outlet 7 and solid matter is removed separately (not shown). In such separations, particulate matter e.g. cellulosic material and SAP is separated from the soluble matter. The particulate matter is preferably further separated into SAP and cellulosic fractions e.g. using pulp pressure screening, suction vibration screening or other screening devices, hydrocyclones, core cleaners and the like. In preferred embodiments, the cellulosic matter is re-introduced into the process e.g. at module III, but it may be subjected to further separate treatment. However, the cellulosic fraction may find end-uses without further treatment or be treated in other ways. If the cellulosic fraction is to be introduced back into the process and/or if the cellulosic fraction is to be used in other end-uses, it is preferable to separate the SAP from the cellulosic fraction. Such separation might be complicated by agglomeration of the fibres in the cellulosic fraction around the particles of SAP, and a consequent tendency to form "fluff balls". Use of surfactants may alleviate any problem of fluff balls, but it is preferred that a pulper be used, as shown in FIG. 3.

In the embodiment of FIG. 1, the stock passing from module II to module III is primarily in the form of the components of the absorbent sanitary paper products, usually without SAP and cellulosic components thereof. The subsequent steps in the process are primarily directed to converting the stock to a form in which it is capable of being recycled or used in a subsequent process.

In module III, the stock is subjected to washing, for example to further clean the stock and to remove additives introduced in modules I and II. The pH of the liquid will also tend towards a neutral value, especially if modules I and II have been operated at e.g. acidic pHs.

In module IV, the stock is further treated with water, especially using water containing detergents. The detergent solution enters through inlet 9 in module IV and may be passed into module III countercurrent to the flow of stock, so that in module IV the stock contacts cleaner solution than it had previously contacted in module III. In embodiments, solution used in the treatment in module IV may be used as all or part of the feed to module III. The solution in module IV will normally have a high pH e.g. a pH of 11 or higher, to prepare the stock for and assist in cleaning, detergent efficiency, bleaching and whitening of the stock. Preferably, the solution has a temperature of at least 62.5° C., and a preferred treatment time is 4–30 minutes.

In modules V and VI, the stock is subjected to an aqueous solution of a peroxide, especially hydrogen peroxide, especially in amounts that give a free oxygen content of 50–500 ppm, preferably at least 100 ppm in the solution. The peroxide bleaches (whitens) cellulosic components of the stock, and may also effect some microbiocidal treatment of the stock. The peroxide solution enters at inlet 10 in module VI and passes in a countercurrent manner through module V and into module IV, during which it is admixed with the detergent solution. It is preferred that the amount of peroxide entering module IV be slightly greater than the amount required to fully treat the stock.

The stock is then washed in module VII and again in module VIII. The latter may be an acidic solution, and any acid used should be a weak organic or inorganic acid e.g. acetic or phosphoric acid, and environmentally safe. In some instances, the market place prefers cellulosic components that have been treated with an acidic solution, but more typically prefers cellulosic material that is neutral to slightly alkaline.

The stock is washed, in a countercurrent manner, in modules IX and X. In these modules, especially module IX, the stock is preferably treated with a microbiological agent, especially peracetic acid but other examples of which are chlorine dioxide or an agent that will release chlorine dioxide; microbiological agents that do not contain chlorine are preferred. The treatment with peracetic acid is preferably carried out at a pH of about 9 or higher, although the treatment with chlorine dioxide may be at a different pH. A preferred amount of agent is 100–500 ppm, with preferred treatment times of at least 30 seconds, especially 1–2 minutes. An alternative method of treatment is use of an autoclave e.g. using a treatment time of 15 minutes at elevated pressure and temperature e.g. 120° C. High intensity microwave radiation may also be an alternative.

The final treatment step in the process of the embodiment that is illustrated in FIG. 1 is a wash step, in module XI. The drum in module XI preferably has perforations that are relatively large e.g about 9 mm in diameter. The wash step and the use of such drums permits separation of cellulosic components in the stock in the module from plastic components e.g. by the flushing out of cellulosic components from the larger plastic components. The cellulosic components may then be dewatered e.g. using a dewatering press, and dried. Examples of dewatering presses include screw type presses and twin wheel presses, and other presses capable of dewatering cellulosic pulp materials. The dewatering step should increase the solids content to 40–55% by weight, after which the cellulosic component would usually be subjected to a drying step e.g. in a flash drier, convection drier, infrared or microwave drier; other types of driers are known for drying cellulosic component. Moisture contents of 5–7% by weight are attainable. SAP affects the ability to dry the cellulosic component, and the cellulosic component should contain a low level of SAP. The plastic component may also be dewatered and dried; the plastic component may be subjected to further comminution and/or separation into fractions.

The process has been described with particular reference to an embodiment in which SAP is separated from the process in modules I and II. This is the preferred mode of operation of the process. However, the process may also be operated without separation of the SAP from the process in modules I and II. In the latter mode of operation, the level of SAP should be low e.g. because the stock fed to the process has a low level of SAP, or steps should be taken to reduce adverse effects of SAP. For instance, the SAP may be treated with crosslinking agents, for example aluminum sulphate, or mixtures of crosslinking agents, as described above.

Although the process has been described herein with reference to a particular sequence of steps, it should be understood that that sequence may be varied, especially subsequent to module II. In some instances, variation of the sequence may have substantial effects on the products obtained and/or the efficiency of operation of the process.

In the operation of the embodiment of FIG. 1, the drums of each module are moved in order to agitate the stock in the solution in each module; beater bars or other devices may be used to increase mechanical action. It is preferred that the drums be rotated. After a period of time, the liquid is separated from the stock and the stock is transferred to the next step in the process. In this mode of operation, the contact time of the stock in each module is the same; if further contact time of stock in a particular solution is required, then an additional module may be added to the apparatus for further treatment of the stock in that solution. Alternatively, independent rotation of some or all drums permits treatment times in each module to be varied, which may affect the throughput of the process. Typical contact times are 2–6 minutes, especially 2–3 minutes but other times may be used e.g. up to 20 minutes.

In a preferred embodiment, the process is carried out in the apparatus as shown in cross-section in FIG. 2. In one embodiment of operation, absorbent sanitary paper products in shredded form are inserted into inner basket 103. A wash solution is then flowed into the outer shell 101, or directly into inner basket 103, preferably so that the liquid level is about half-way up the inner basket 103. Inner basket 103 is rotated in the direction, the wash direction, so that screen 106 is the trailing section of separation chamber 105.

After a period of time, the direction of rotation is reversed. With the reverse rotation, the separation direction, particulate matter flows into the separation chamber 105 through screen 106 and out of separation chamber 105 through orifice 108. The particulate matter then collects in outer shell 101 near the location of drain 102.

Liquid and particulate matter may separately be removed from outer shell 101 through valves 109 and 110.

In embodiments, the apparatus may be used to separate SAP and cellulosic material from plastic material, but separations of a variety of combinations of particular particulate matter may be made.

The inner basket 103 may be made of a screen material such that particulate matter will flow through the screen into outer shell 101.

It is understood that the mesh size of screen 106 and of any screen forming inner basket 103 may be selected so that only part of any particulate matter in the shredded absorbent sanitary paper products will pass through, thereby effecting a size separation of particulate matter.

Using the apparatus shown in FIG. 3, absorbent sanitary paper products in shredded form are inserted into inner basket 203. Drum 201 may be in any desired orientation, but in preferred embodiments is in a substantially horizontal orientation, to facilitate loading of the inner drum 203. Inner drum 203 may then be rotated, by means not shown, with pulper 210 optionally being in operation; in other respects, the process is operated substantially as described above. Prior to discharge of the contents of drum 201, drum 201 is tilted, especially into a vertical orientation. If not already operating, pulper 209 is operated to comminute particulate matter in drum 203, to the extent that solid matter may pass through perforations 207.

The matter i.e. particulate matter and solution, discharged from the drums shown in FIGS. 2 and 3 may be treated in the manner described with respect to FIG. 1. Alternatively, the matter may be recycled back into the apparatus of FIGS. 2 and 3, and subjected to further treatment in such apparatus, according to the process of the invention.

In embodiments in which matter is subjected to a pulper and a core cleaner, it is to be understood that the concentration of solids will decrease significantly from module I to the core cleaner. For instance, the operation in module I may be operated with stock in its various forms such that a slurry with a solids concentration of about 6–12% by weight is obtained. For the pulping step, the concentration of the slurry should be reduced to about 4–6% by weight and at the core cleaner the concentration of the slurry should be about 0.4–1.2% by weight. Similar changes in preferred concentrations may occur for other methods of operation of the process of the invention.

In an embodiment of the invention, a fraction containing both a cellulosic fraction and a plastic fraction may be separated e.g. from module I. This separated fraction may be sanitized at a low pH and then super absorbent polymer present in the fraction may be cross-linked to provide a particulate matter e.g. in the form of a grit. The resultant product may be dried and subjected to an air separation, in which event a fibrous and grit fraction would be obtained.

In a preferred embodiment, the solids in module I are subjected to a pulper in that module. The particulate matter discharged from module I is subjected to a barrier screen, to remove large particulate matter, and then to one or more core cleaners.

The process of the present invention has been described with particular reference to FIG. 1 and the use of modules, subsequent to module II, that are in the form of rotatable drums. While this may be convenient, it may also be convenient to operate such portion of the process using other stirred apparatus e.g. stirred tanks.

Although the operation has been disclosed as being continuous, a dis-continuous operation may be used. In the latter, a screen could be placed over orifice 108 and screens of different meshes could be located within separation chamber 105; on stopping operation, particulate matter of different particle sizes could be separately removed.

After the washing of the absorbent sanitary paper product, remaining material may be further processed in the same apparatus using the steps described hereinbefore, using a treatment designed specifically for remaining material or removed from the apparatus of FIG. 2 and processed in separate apparatus. In an embodiment, matter remaining in the apparatus may be removed by vacuum, especially after partial drying.

In the separation of solid or particulate matter from liquid, especially liquid used in treatment of the particulate matter, it is to be understood that the means of separation could include use of spin or centrifugal techniques, including with concurrent spraying of a solution especially water, onto the particulate matter during the spinning or centrifugal step. Such a spray would assist in cleaning the particulate matter, especially removal of other liquid present on the particulate matter.

In its overall context, the present invention will permit a recycling system that would involve collection of absorbent sanitary paper products, after use, in plastic bags or other suitable collection containers from households, institutions, hotels and the like, including a polyethylene bag e.g. a bag of thickness of about 0.75 microns, that could be provided by the manufacturer of the product i.e. included in the package of diapers as sold. The containers would then be transported to a processing facility and kept in storage, normally cold storage, prior to being processed for treatment of the absorbent sanitary paper products and recovery of reusable components; the bags or collection containers may remain sealed until actually fed to the process. The products would then be treated according to the process of the invention.

Cellulosic material obtainable from the process of the invention is relatively un-degraded and un-refined material, compared to cellulosic material that has been subjected to processes for the manufacture of paper, tissue or towelling. In addition, the cellulosic material is cleaner i.e. whiter, than cellulosic material obtainable from many other sources. It has potential for use in a wide variety of end-uses, including the manufacture of e.g. absorbent sanitary paper products, and fine and other paper. The plastic component, which may contain and admixture of polyethylene and polypropylene in fibrous and sheet form, elastic and spandex components, minor amounts of SAP and some cellulosic material, all comminuted to the order of 3–6 mm in the major dimension, has been found to be effective in adsorption of oil, especially from oil/water mixtures. The SAP is recoverable from its cross-linked state as recovered from module II in the embodiment described above, and may be used for recovery of monomer, which can be accomplished with high intensity gamma radiation or other treatment that de-polymerize the SAP, as abrasive or other filler and in agricultural end-uses for controlled release of water or additives. Many of the solutions used in the process may be treated for recovery of components, used elsewhere in the process or in other processes. The plastic component may also be used without further separation of components, as either filled or unfilled compositions, e.g. in the manufacture of plastic/wood products or cast or moulded products. Alternatively, the plastic component may be subjected to further processing, to separate polyethylene and polypropylene components, to separate elastic components and to separate other components that may be present; such up-graded plastic components may be used in end-uses having more demanding requirements for the materials that may be used.

The present invention is illustrated by the following examples:

EXAMPLE I

A series of tests were performed to test the effect of various aqueous liquids on particles of SAP. Each test was performed in duplicate. The SAP used was Favor™ SAB 800 super absorbent polymer, obtained from Stockhausen, Inc. of Greensboro, N.C., U.S.A.

Two SAP particles., each having a volume of approximately 0.7–1.0 mm$^3$, were placed on a microscope slide, and the dimensions of the particles were determined. The particles were then contacted with a solution, and the dimensions of the particles were monitored over a period of 20 minutes. The solution was then absorbed away from the particles, and the dimensions of the particles were monitored further.

Further experimental details and the results obtained are given in Table I; the data reported in Table I is the relative volume of the SAP particle.

TABLE I

| Liquid | Time (min.) | | | |
|---|---|---|---|---|
| | 0 | 10 | 20 | 160 |
| Distilled Water | 1 | 102 | 141 | 141 |
| Tap Water | 1 | 92 | 112 | 112 |
| 0.5% copper sulphate on SAP treated with distilled water | 1 | 0.21 | 0.17 | 0.075 |
| 0.5% copper sulphate on SAP treated with tap water | 1 | 0.29 | 0.18 | 0.11 |
| 0.5% copper sulphate | 1 | 2.2 | 3.14 | 1.40 |
| 0.5% aluminum sulphate | 1 | 13 | 17 | 1.5 |
| 0.5% citric acid | 1 | 3,6 | 4.9 | 1.5 |
| 0.5% citric acid/ aluminum sulphate (1:1) | 1 | 1.9 | 2.5 | 1.3 |
| 0.5% sodium chloride | 1 | 7.2 | 12 | 2.4 |
| 0.5% acetic acid | 1 | 4.3 | 6.4 | 1.5 |
| | 1 | 81 | 126 | 126 |

The results show that SAP particles absorb substantial amounts of water and undergo large increases in volume. For example, in distilled water the particles of SAP increased in size by 141 times. However, addition of aqueous solutions of copper sulphate, aluminum sulphate or citric acid resulted in substantially smaller increases in volume, and moreover caused swollen particles of SAP to undergo substantial decreases in volume i.e. to reverse the swelling caused by water. The particulate changes morphology and physical properties when exposed to the cross-linking agents and becomes spherical in shape, experiences notable changes in specific gravity and becomes hard. The change in specific gravity and increase in hardness leads to easier physical separation of the SAP.

EXAMPLE II

A series of batches of diapers were subjected to the treatment process disclosed herein using an experimental 36 kg batch tunnel washer formed from 3 modules. A total of 55 batches of soiled diapers were cut open from collection bags and then each batch was subjected to the following steps:

(a) a rinse cycle using water for a period of 6 minutes;

(b) a pre-wash cycle for a period of 9 minutes using an aqueous solution containing 156 ml of non-ionic detergent (Ecolab Detergent #1, obtained from Ecolab Ltd. of Mississauga, Ontario, Canada) and 1625 ml of a solution of alkali (Ecolab SL2000, 29% NaOH) in a total volume of 144 liters;

(c) a main wash cycle for a period of 6 minutes at approximately 62.5° C. in a solution of 57 ml of the detergent, 1573 ml of the alkali solution and 255 ml of hydrogen peroxide (identical to Ecolab Oxybrite 35%) in 144 liters of solution;

(d) a rinse cycle for a period of 3 minutes in water;

(e) an acidification cycle for a period of 3 minutes in a solution of 1305 ml of acetic acid in 144 liters of solution; and (f) a rinse cycle for a period of 7 minutes in a solution containing 1400 ml of chlorine dioxide (20,000 ppm concentration) in 144 liters of solution. A solution containing cellulosic fibres was flushed from the process, leaving a plastic component. Both the cellulosic fibres and the plastic component were recovered and dried.

The batches of diapers were composed of diapers of three different constructions, in different proportions. The diapers were Luvs® and Pampers® both available from Procter and Gamble, and Huggies® from Kimberly-Clark. The composition of the batches was varied; some batches contained 100% of Huggies or 100% of Pampers, but the batches more typically contained 37–38% of Huggies, 43-49% of Pampers and 14–20% of Luvs. Each batch size was approximately 12 kg.

The results showed that a good separation of SAP from cellulosic component could be obtained, as well as a very good separation of SAP and cellulosic component from the plastic component in the diapers. The cellulosic component was a bright white with high integrity. There was no evidence of problems due to presence of so-called "stickies" from adhesives on screens or other parts of the washers. The plastic components remained intact, with the spandex portions and tape tabs attached thereto. Printing was not removed from the plastic components.

EXAMPLE III

A pilot-plant scale apparatus for the treatment of absorbent sanitary waste, specifically diapers, was assembled by modifying a standard horizontal linen washer having a capacity of 23 kg. The washer was modified as follows:

(a) the inner drum was lined with a fine stainless steel mesh that was capable of retaining wood pulp, super absorbent polymer and plastic components while permitting liquids to pass through;

(b) a scoop was cut into the inner drum, in the manner shown in FIG. 2. This created a gate into the cavity between the inner and outer drums, the gate being screened with circular perforations having a diameter of 0.95 cm;

(c) the washer door was fitted with seals so that wood pulp, super absorbent polymer and plastic components would be retained within the inner drum;

(d) three sets of sharp tooth-like blades were attached to the inner drum, to increase mechanical action and to tear open diapers within the drum;

(e) a 50 L reservoir was added to the bottom of the outer drum, for retention of liquids and slurries separated from the inner drum;

(f) the drive motor on the drum was replaced with a variable speed motor, it being understood that rotation of the drum was reversible as described with reference to FIG. 2;

(g) two fluid ports were added to the bottom of the reservoir on the washer, one of which was unscreened and intended for removal of slurry of wood pulp and super absorbent polymer from the washer. The other had a filter having an air pressure cleaning system, and was intended for removal of liquids from the washer; and (h) two vacuum ports were added to the washer, one in the door for addition of diapers and the other in the top of the vessel for creation of reduced pressure within the washer, thereby facilitating addition of diapers to the washer.

Storage vessels equipped with pump and recycle systems were provided, for wash and chemical solutions, and for use and re-use of these solutions, as appropriate. A settling tank was provided for effluent from the process, from which solid material could be discharged and liquid could be recycled back to the process.

Means were provide for transport of a slurry of wood pulp and super absorbent polymer from the reservoir of the washer to a hydro-pulper. The hydro-pulper was similar in design to that shown, in a different context, in FIG. 3; the pulper head was rotatable at 750 rpm i.e. a blade speed of 110 m/min. The slurry from the hydro-pulper could be transported to a storage chamber, from where it could be subjected to (i) a vibrating barrier screen for removal of coarse contaminants e.g. pieces of plastic and tissue, (ii) a posi-flow centrifugal cleaner for removal of cross-linked super absorbent polymer and other heavy contaminants, and (iii) a uni-flow cleaner for removal of light weight contaminants.

Plastic component remaining in the drum of the washer could be removed and subjected to a hydro-pulper, as described above, then recycled back to the washer, and further wood pulp separated therefrom. The resultant plastic component could be removed from the washer and dried, with the pulp being treated as described above.

The pulp separated from the process could be dewatered, bleached, sanitized and rinsed, and finally dewatered and dried.

The apparatus described above was constructed to develop efficient methods of recycling of the components of disposable diapers. While there are many variations in the manner in which the apparatus may be operated according to the invention, the following experiment will outline a procedure for treatment of diapers.

Fifty soiled diapers were collected from a local household. These diapers were Pampers® diapers manufactured by Procter & Gamble, and were diapers of a large size and coloured in girl's colors. The diapers had inner and outer plastic sheets, the inner being permeable to moisture, with an intermediate core of wood pulp which included a super absorbent polymer.

The diapers were placed, whole, in the washer. The load was then saturated with water and tumbled, by rotation of the washer drum at a speed which produced maximum agitation i.e. rotated so that the washer load was transported to the top of the drum but then dropped to the bottom of the washer drum. This function was performed for one minute. It was observed that the blades on the inner drum effectively de-balled the diapers and tore the outer or non-woven topsheets of the diaper, thereby helping release wood pulp from the diaper.

One-hundred liters of wash solution was then added to the washer. This solution included 100 mL of concentrated detergent. The load was then tumbled with maximum mechanical action for a period of three minutes.

A concentrated solution of sodium sulphate was added to the washer, such that the concentration of sodium sulphate in the wash solution was 0.5% by weight. It was observed that the super absorbent polymer shrunk dramatically. The load was tumbled in the sodium sulphate solution for a period of 1.5 minutes, after which the solution was pumped from the washer through the filter in the reservoir to the effluent tank.

The washer was filled with fresh rinse water and the washer load tumbled in the rinse water for a period of two minutes. The rinse water was then removed from the washer through the filter in the reservoir and stored in a tank for subsequent re-use as the wash solution for the next batch of soiled diapers.

The washer was filled with a solution of a mixture of 2% sodium sulphate and 1% aluminum sulphate. The washer load was then tumbled in this solution for a period of two minutes. It was observed that the characteristics of the super absorbent polymer had changed from soft, spongy, rubbery material, to a hard grit sand-like material; this is believed to be a cross linking effect. The solution was removed through the filtered outlet to the reservoir and sent to a storage tank for subsequent re-use in the next batch of soiled diapers.

The washer was then filled with fresh water and rotated in the separation direction i.e. the reverse of the direction of rotation used previously, for a period of three minutes. A moderate speed of rotation was used, so that the scoop moved through the slurry within the washer at a moderate speed and the pulp and super absorbent polymer were separated from the plastics and transported into the washer reservoir. On visual inspection, approximately 95% of the pulp/super absorbent polymer were removed from the plastics during this separation. A slurry of pulp/super absorbent polymer collected in the washer reservoir and was then pumped to the hydro-pulper.

One-hundred liters of water was added to the hydro-pulper, giving a total fluid content of 250 liters. This produced a slurry solution with a 1% consistency i.e. 1% solids content; other batches have been run in the pulper at consistencies of up to 8%.

The pulper was run for a period of three minutes. The resultant slurry was then transported to a storage tank, and maintained in agitated storage.

The plastic component was vacuumed out of the washer and transferred into the hydro-pulper. 100 liters of water were added and the resultant slurry was pulped for a period of one minute. The slurry was then de-watered and vacuumed back to the washer. Water was added to the washer, which was then operated in the separation mode i.e. with reverse rotation of the drum, for a period of 1 minute. The fibre that was recovered was combined with the slurry of fibre and super absorbent polymer in agitated storage. After addition of further water to reduce the consistency of the slurry i.e. reduce the solids content, the slurry was fed to the vibrating barrier screen, the posi-flow cleaner and the uni-flow cleaner to separate wood pulp from super absorbent polymer, the latter being in the form of a grit.

The plastic component was disinfected in the washer with a solution of sodium hydroxide (pH 12) and peracetic acid (1.5% by weight). The plastic component was then de-watered and rinsed with water for a period of one minute. The plastic component was then dried in a tumble dryer over a period of 25 minutes. It was observed that the plastic component contained only a very minor amount of wood pulp. Most of the glue lines on the back sheets of the diapers seemed to be have remained intact indicating that most of the adhesives remained with the plastic component. It was also observed that most of the wet strength tissue (latex coated tissue) used in the construction of the diapers had remained with the plastic component.

The plastic component was granulated into a fluffy material which is suitable as a commercial oil sorbent.

As noted above, the wood pulp contained in agitated storage was processed, in sequence, through the vibrating barrier slot screen, hydrocyclone posi-flow cleaner and the hydrocyclone uni-flow cleaner.

It was observed that large pieces of tissue (approximately 2.5×2.5 cm or smaller) and large pieces of plastic were the main components in the vibrating barrier screen's rejected stream. These rejects were collected and allowed to dry in the air.

The slurry from the vibrating barrier screen was pumped through the uni-flow cleaner. It was observed that a very minor amount of contamination was present in the rejected stream in the screen of the uni-flow cleaner. The rejects were made up primarily of small pieces of tissue (0.3×0.3 cm), small shards of plastic and very small clusters of wood pulp which appeared to be bonded together by tiny pieces of adhesive. The slurry was passed twice through the uni-flow circuit.

The slurry was then pumped through the posi-flow centrifugal cleaner. This cleaner aggressively stripped the cross linked super absorbent polymer out of the slurry. The slurry was passed through this circuit a total of four times. The rejects were collected in a large stock tank. On examination of the rejects it was observed that they consisted of approximately 60–70% super absorbent polymer, 30–40% fibre and a minor amount of tissue. The slurry from the posi-flow circuit was placed in agitated storage.

The rejects collected from the posi-flow cleaner were vigorously agitated. The rejects in the form of a slurry were then pumped through the posi-flow circuit for a total of three cycles. Upon examination of the posi-flow rejects thus obtained, it was observed that the content of fibre had been reduced significantly. The rejected stream now appeared to be approximately 85% super absorbent polymer and 15% fibre with other minor contaminations of fine bits of tissue and other grit contaminants. Fibre recovered from this process was added to the slurry of fibre obtained previously.

The super absorbent polymer slurry was dewatered on a fine mesh screen, collected and placed in a fine mesh polyolefin bag. This bag and its contents were then washed in a standard household washer, with detergent, and dried in a household dryer. It was observed that the super absorbent polymer and wood pulp fibre separated from each other naturally during the drying process. The fibres collected together in small balls approximately 0.6–1.0 cm in diameter. The super absorbent polymer and fibre were then separated from each other using a small vibrating screen. The perforations in the screen were approximately 0.3 cm square. A solution of sodium hydroxide (pH 11) was then added to a measured amount of the recovered super absorbent polymer. It was observed that the super absorbent polymer swelled to approximately 5–10 times its size absorbing the caustic solution. Thus, caustic solutions seem to reverse the super cross linking effect produced by the aluminum sulphate. It is believed that the recycled super absorbent polymer may be charged with nitrogen and other nutrients so that it may be used as a control release agent in composting or agriculture.

The wood pulp or fibre slurry was transferred to the hydropulper. In the hydropulper the slurry was dewatered in a hot bath, at 75° C., of sodium hydroxide (pH 12) and hydrogen peroxide (1%). The slurry was pulped for a period of three minutes. The slurry was then dewatered and a new bath introduced. The new bath was a hot solution (75° C.) of sodium hydroxide (pH 9.5) and peracetic acid (1.5%). The slurry was pulped in this solution for a period of three minutes. The slurry was then dewatered and rinsed with fresh water. A small amount of acid (citric acid) was added to the rinse solution to adjust the pH to seven. The slurry was then dewatered on a fine mesh screen.

It was observed that the pulp was virtually free of any contamination. Super absorbent polymer could not be detected either visually or by touch. The pulp appeared bright white and very smooth and silky to the touch. On close examination, only a very small number of plastic bits and tiny pieces of grit could be detected. Upon first inspection, the pulp appears to have brightness and physical integrity to be reused in sanitary paper applications; previous morphology testing in earlier recycling test batches is consistent with this observation.

We claim:

1. A process for the treatment of super absorbent polymer-bearing sanitary paper products to separate such products into components thereof that are in a form suitable for recycling or re-use, said products comprising plastic, cellulosic and super absorbent polymer solid fractions, the process including the steps of:

(a) treating said products in at least one bath of an aqueous solution:

(b) dissolving soluble matter from said products in said aqueous solution;

(c) treating the super absorbent polymer with a water-soluble compound of at least one of an alkali metal, an alkaline earth metal, aluminum, copper (II), iron (III) and zinc to reduce swelling of the super absorbent polymer in said aqueous solution; and (d) separating said aqueous solution with soluble matter from at least one of the solid fractions.

2. The process of claim 1 in which the super absorbent polymer is treated to both reduce swelling of the super absorbent polymer and cross-link the super absorbent polymer so as to form particulate matter.

3. The process of claim 2 wherein the cross-linking of the super absorbent polymer takes place in said bath.

4. The process of claim 2 wherein said aqueous solution in said at least one bath includes said water-soluble compound used to reduce swelling of the super absorbent polymer and said aqueous solution is subsequently re-used within the process.

5. The process of claim 1 in which the temperature of operation of the bath is not higher than 70° C.

6. The process of claim 1 wherein said bath has a pH in the range of 3–8.

7. The process of claim 1 in which step (a) includes use of a pulper and/or an agitator.

8. The process of claim 1 in which the process is carried out in a single drum or using a monoshell.

9. The process of claim 1 wherein said aqueous solution is re-used within the process.

10. The process of claim 1 in which said products are contained in a collection container, and said collection container may also be treated in the process.

11. The process of claim 1 wherein the solid fractions are treated with antimicrobial agents.

12. The process of claim 1 wherein said products are shredded prior to the step of treating said products in said at least one bath of an aqueous solution.

13. The process of claim 12 wherein the step of treating said products in said at least one bath with an aqueous solution comprises the steps of batch washing the products in a first aqueous bath followed by treatment in at least one additional aqueous bath.

14. The process of claim 12 further comprising the step of separating the solid fractions into at least two parts, one of which is substantially comprised of particulate matter and the other of which is substantially comprised of the plastic fraction.

15. The process of claim 14 in which the super absorbent polymer is treated to both reduce swelling of the super absorbent polymer and cross-link the super absorbent polymer so as to form particulate matter.

16. The process of claim 14 in which the super absorbent polymer is separated from other particulate matter.

17. The process of claim 14 wherein the step of separating the solid fractions into at least two parts includes generating separate streams comprising the plastic fraction and the cellulosic fraction.

18. The process of claim 17 in which the super absorbent polymer is treated to both reduce swelling of the super absorbent polymer and cross-link the super absorbent polymer so as to form particulate matter.

19. The process of claim 14 further comprising the step of separating the particulate matter into two streams, one of which is substantially comprised of the cellulosic fraction and the other of which is substantially comprised of the super absorbent polymer fraction.

20. The process of claim 19 further comprising the additional subsequent step of:

treating at least one fraction of the particulate matter with at least one aqueous washing solution and with at least one aqueous solution of at least one of bleaching agent, brightening agent and antimicrobial agent.

21. The process of claim 19 wherein the step of treating the super absorbent polymer with a water-soluble compound to reduce swelling of the super absorbent polymer also changes the specific gravity of the particles of super absorbent polymer.

22. The process of claim 21 wherein the step of separating the solid fractions is conducted with at least one of hydrocyclones, posi-flow centrifugal cleaners and core cleaners.

23. The process of claim 22 wherein the super absorbent polymer fraction is separated in the form of grit.

24. A process for the treatment of super absorbent polymer-bearing sanitary paper products to separate such products into components thereof that are in a form suitable for recycling or re-use, said products being comprised of plastic, cellulosic and super absorbent polymer fractions, said process comprising the steps of:

(a) treating said products with an aqueous solution under conditions that are conducive to non-destructive separation of the products into components thereof;

(b) cross-linking the super absorbent polymer;

(c) subsequently separating the products into at least three parts, one of which substantially comprises soluble matter, one of which substantially comprises the cross-linked super absorbent polymer, and another of which substantially comprises at least one of the plastic and cellulosic fractions.

25. The process of claim 24 which the cross-linked super absorbent polymer is separated from the cellulosic fraction using a hydrocyclone or core cleaner.

26. A process for the separation of super absorbent polymer from an admixture in aqueous solution of a cellulosic fraction and a super absorbent polymer fraction, comprising:

treating said admixture to effect a change in the specific gravity of super absorbent polymer; and separating the super absorbent polymer so treated from the cellulosic fraction.

27. The process of claim 26 wherein the super absorbent polymer is separated centrifugally.

28. The process of claim 27 wherein the centrifugal separation uses a posi-flow centrifugal cleaner.

29. The process of claim 26 wherein the super absorbent polymer is separated by filtering.

30. The process of claim 26 in which the super absorbent polymer separated from the admixture is a hard grit-like particulate.

31. The process of claim 26 wherein the step of treating said admixture to effect a change in the specific gravity of the super absorbent polymer increases the specific gravity of the super absorbent polymer and increases the difference between the specific gravity of the super absorbent polymer and that of water.

* * * * *